United States Patent [19]
Kraus

[11] 3,960,417
[45] June 1, 1976

[54] HYDROSTATIC AXIAL THRUST BEARING

[75] Inventor: Charles Edward Kraus, Austin, Tex.

[73] Assignee: Excelermatic, Inc., Austin, Tex.

[22] Filed: June 16, 1975

[21] Appl. No.: 587,032

[52] U.S. Cl............................ 308/170; 308/DIG. 1; 308/9
[51] Int. Cl.² ........................................ F16C 1/24
[58] Field of Search................ 308/168, 170, 134.1, 308/122, 139, 160, 163, 162; 267/161

[56] References Cited
UNITED STATES PATENTS

| | | | |
|---|---|---|---|
| 1,006,174 | 10/1911 | Anker-Holth........................ | 308/172 |
| 1,403,694 | 1/1922 | Kingsbury............................ | 308/160 |
| 1,586,443 | 5/1926 | Flintermann........................ | 308/160 |
| 2,218,034 | 10/1940 | Bartosch............................. | 308/139 |
| 2,708,610 | 5/1955 | Donaldson et al.................. | 308/162 |
| 3,382,014 | 5/1968 | Marley................................. | 308/9 |
| 3,495,886 | 2/1970 | Roberts............................... | 308/160 |
| 3,619,016 | 11/1971 | Kraus................................... | 308/160 |
| 3,635,534 | 8/1969 | Barnett................................ | 308/160 |
| 3,788,713 | 1/1974 | Kraus................................... | 308/160 |

Primary Examiner—M. H. Wood, Jr.
Assistant Examiner—Gene A. Church

[57] ABSTRACT

A hydrostatic axial thrust bearing has a load member supported on a support member by pressurized fluid supplied to a cavity providing a hydrostatic bearing area between the two members in a plane normal to the axis of the thrust bearing and including means for varying the effective bearing area to permit the bearing to adjust to large variations in load.

10 Claims, 3 Drawing Figures

HYDROSTATIC AXIAL THRUST BEARING

BACKGROUND OF THE INVENTION

1. Field of the Invention

The present invention relates to a hydrostatic axial thrust bearing which includes means for varying the hydrostatic bearing area for adjustment to the bearing load.

2. Description of the Prior Art

A hydrostatic axial thrust bearing consists of a support member and a load member disposed adjacent to the support member with a cavity between the two members to which cavity pressurized fluid is supplied for supporting the load member on the support member. The pressurized fluid supplied to the cavity leaves the cavity through a land area formed around the cavity between the load and support members. However, as the bearing load is increased the pressure of the fluid in the cavity increases and the amount of fluid leaving the cavity increases or the gap between the load and support members decreases until the load can no longer be supported by the pressurized fluid in the cavity. This occurs when the pressure of the fluid supplied to the cavity is smaller than the pressure required in the cavity to support the load.

Hydrostatic axial thrust bearings must, accordingly, be sized for the largest load even if such peak loads are effective only for very short periods. However, the larger the bearing, the larger are of course also the bearing drag or shear losses. Since these losses are substantially independent of the bearing load they are always present at essentially peak value. They are even then at peak value when the bearing load is relatively small, as it ususally is during high speed operation when the shear losses are greatest.

SUMMARY OF THE INVENTION

In a hydrostatic axial thrust bearing having a load member supported on a support member by a pressurized fluid supplied to a cavity formed between the two members means are provided which are adapted to vary the effective area of the cavity depending on the load carried by the load member so that the load capacity of the bearing increases with increasing load. In the case of a circular cavity, the diameter would be the preferred variable.

DESCRIPTION OF THE PREFERRED EMBODIMENTS

Figure 1:
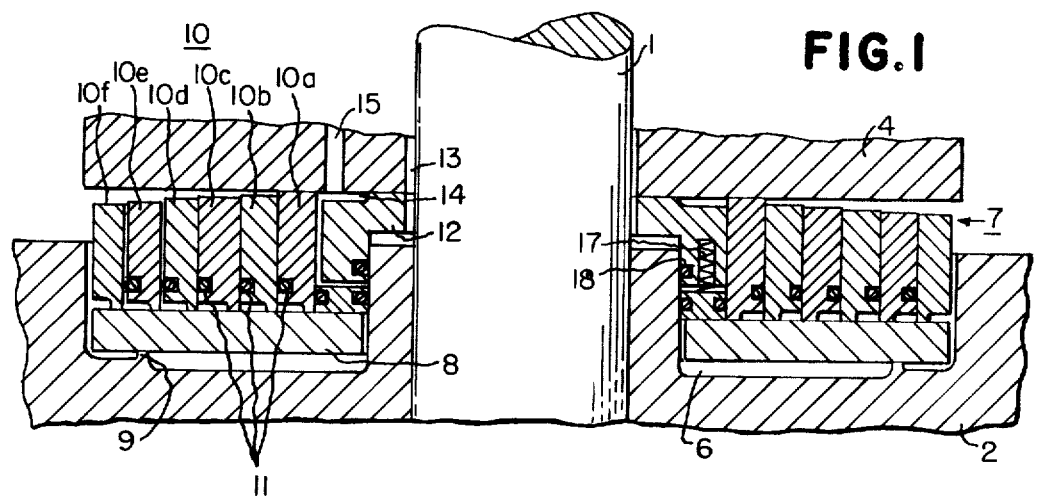
FIG. 1 shows a hydrostatic axial thrust bearing whose lands are formed by axially movable concentric ring members.

FIG. 1 shows a hydrostatic axial thrust bearing in which a support member 2 supports a load member 4 by a hydrostatic bearing structure disposed between the support and the load member. The support member 2 may be mounted on a shaft 1. It has a cavity 6 formed therein which receives the hydrostatic bearing structure 7. The hydrostatic bearing structure 7 consists of a belleville type spring ring 8 which is supported at one radial end — as shown in FIG. 1 at its radially outer end — on a ledge 9 and whose other radial end portion is axially resiliently movable. The resilient ring 8 supports a number of concentrically arranged annular members 10 which are axially movable relative to each other, the space between adjacent members 10 being sealed by seals 11. At the radially inner end of the cavity 6, there is a limited leakage seal ring 12 which — in well known manner remains floating a predetermined distance from the load member 4 to form a limited leakage gap 13 when pressurized lubricant is admitted to the support cavity 14 for supporting the load member 4 on the support member 2. Springs 17 are provided to force the seal ring 12 toward the load member 4 to permit initial pressurization of the cavity 14. Cavity 14 is defined by adjacent surfaces of bottom surface 41 of load member 4, inner surfaces of ring 12 and annular members 10. The pressure receiving area of surface 41 is termed the effective area of the support cavity 14 or the hydrostatic bearing area.

The annular members 10 are of different axial length with the annular member 10a closest to the support cavity 14 being the longest and the closest to the load member 4 in a light load or no load position as shown in FIG. 1. The fluid leaving cavity 14 passes between load member 4 and the upper ends of annular members 10.

When pressurized fluid is admitted to the support cavity 14 through a supply passage 15 the load member 4 is moved away from the support member 2 until the space between the inner annular member 10a and the support member 4 is sufficiently large to permit escape of the lubricant from the support cavity. Under light load, the support cavity is therefore relatively small, its outer circumference being defined by the inner annular member 10a. However, as the load and, accordingly, the lubricant pressure in the support cavity 14 increases due to the downward pressure of member 4, the pressure on the resilient ring 8 also increases and the free end of the resilient ring 8 is deflected in a direction toward the support member 2. The annular members 10 which are supported by the resilient ring 8 are individually in succession subjected to pressure on their upper ends and follow its movement, with the inner annular ring 10a which is supported closest to the free end of the resilient ring 8 experiencing the largest amount of axial displacement.

As the load increases from zero and the resilient ring 8 is deflected, soon the load member 4 comes close enough to the second annular member 10b so that the outer limit of the support cavity is formed by the annular member 10b, thus, the effective hydrostatic bearing area of the support cavity 14 has actually increased. With a circular cavity, the diameter, measured perpendicularly to shaft 1, is increased.

It will be readily understood that, the larger the load and the larger the pressure in the support cavity 14, the more is the free end of the resilient member deflected toward th support member 2 and the larger becomes the support cavity 14 and its effective area as successively the radially outer ring members 10c, 10d, 10e and 10f become closest to the load member 4. At largest load, that is at greatest deflection of the resilient ring 8, the spaces between the inner annular numbers 10a–10c are at their largest value and the space between the outer annular member 10f and the support member 4 is smallest. It may be noted that, depending on the position of the pivot point at ledge 9 for the resilient ring 8, the outer ring member 10f may be moved toward the load member as the inner ring members 10a to 10c are moving away from the load member 4.

This bearing arrangement is able to take up a largely varying load with minimum drag as the area of the support cavity varies with the load and is very small for a small load.

Figure 2:
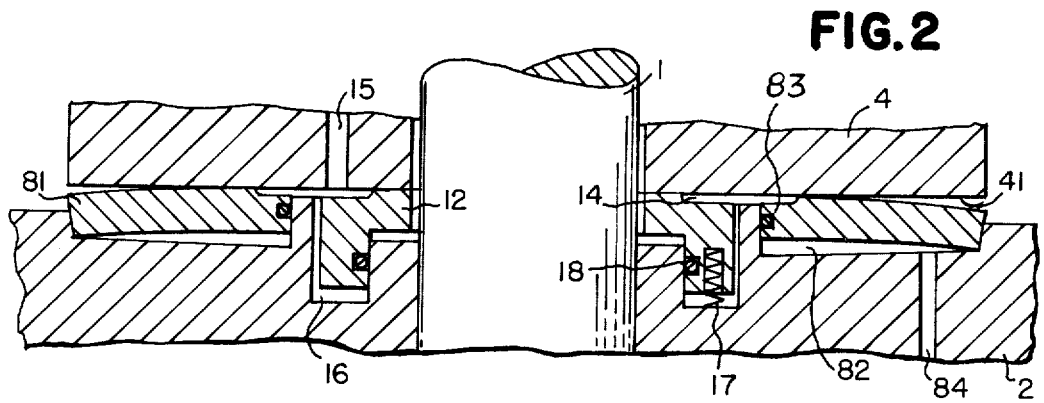
FIG. 2 shows a bearing in which one of the lands is formed by a flexible annular disc.

A support cavity of varying size may also be obtained with the simplified embodiment of the invention shown in FIG. 2 wherein the pressurized fluid escape passage is directly formed by a resilient ring.

Figure 3:
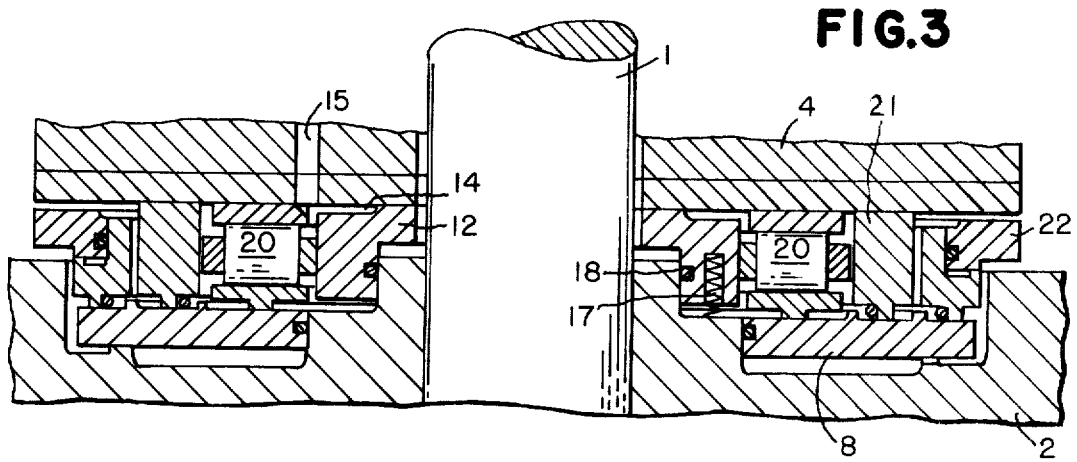
FIG. 3 shows a bearing structure with an antifriction bearing adapted to take up the load when sufficiently pressurized fluid is not available.

In FIG. 2, as well as in FIG. 3 functionally identical arts are identified by the same numerals as in FIG. 1. Again a load member 4 is supported on a support member 2 by a pressurized fluid admitted to the support cavity 14 through a supply passage 15, the support cavity 14 having an area of radial limits as given by the limited leakage seal ring 12 and the narrowest gap between a belleville-type spring ring 81 and the load member 4. The limited leakage seal ring 12 is axially movably supported in an annular cavity 16 and free to follow the movement of the load member 4 as is known in the art. A number of springs 17 are provided to force the seal ring toward the load member 4 to facilitate initial pressurization of the cavity 14. A seal 18 prevents undesired leakage of pressurized fluid from the cavity 14.

The spring ring 81 is disposed in a cavity 82 formed in the support member 2. The spring ring 81 is supported at its radially outer end and is, toward the load member, of convex shape such that its radially inner area is normally closer to the load member than its radially outer area. The radially inner end of the spring ring 81 however is resiliently movable into the cavity 82, a seal 83 being provided between the spring ring 81 and the cavity side wall to prevent pressurized fluid passing from the cavity 14 into the cavity 82 behind the spring ring 81. The cavity 82 behind the spring ring 81 is in communication with a lower pressure area such as a fluid return line which returns the fluid to the source of pressurized fluid by passages such as passage 84. It may, however, be noted, at this point, that the passage 84 could be used to modify the position of the spring ring 81 by modifying the pressure in the cavity 82 behind the spring ring 81.

The effective area of the support cavity 14 is formed essentially by the seal ring 12 at the inner end and that circle on the surface of the spring ring 81 which is disposed closest to the face 41 of the load member 4. This circle however varies with the load. It becomes larger as the load and, concurrently therewith, the fluid pressure in the cavity 14 increases because the pressurized fluid in the cavity 14 forces the inner end of the spring ring 81 into the cavity 82. Because of the convex shape of the spring ring 81 such bending of the spring ring 81 changes the disposition of the surface of the spring ring 81 in such a manner that the circle moves radially outward so that the size of the effective area of the load cavity 14 is increased with increased fluid pressure.

This arrangement makes it possible for the bearing to support a greatly variable load with a pressure source which may supply only a relatively low pressure or a pressure source which provides not always full pressure such as a pump driven by a shaft having a speed which is variable independently of the bearing load. Furthermore, of course, at low bearing load, the circle of smallest distance between the spring ring 81 and the load face 41 is dependent on the load and is relatively small for a small load so that also the drag in the bearing is relatively small when the load is small.

The size of the load cavity should, of course, be as small a possible and, accordingly, its minimum size depends on the pressure available from the pressurized fluid source. If the fluid source is a pump this pressure will normally depend on the speed of the pump so that the cavity 14 could be smaller at high pump speeds. It is therefore possible to modify the size of the load cavity also in accordance with the pressure available from the pressurized fluid source, that is the pump speed, by providing in the space 82 behind the spring ring 81 a modifying pressure variable with the pressure available from the pressurized fuel source or with the pump speed.

FIG. 3 shows an arrangement similar to FIG. 1 including, however, an antifriction bearing 20 supported at the radially inner end of the spring ring 8 which supports the load member 4 when the pressure in the support cavity is low or when there is no load or no pressure as for example during startup. When sufficiently pressurized fluid becomes available in the support cavity 14 the spring ring 8 is deflected at its inner end so that the bearing 20 moved away from the load member 4 which then is solely supported by the pressurized fluid in the support cavity 14 which is formed between the seal ring 12 and the annular member 21. When the load and the pressure in the support cavity increase further, the spring ring 8 is further deflected at its inner end until, finally, the annular member 22 is closer to the load member 4 than the annular member 21 and the support cavity 14 is extended up to member 22.

This arrangement, like those of FIGS. 1 and 2, is capable of adapting to a greatly variable load and to a fluid source of greatly variable pressure, but, furthermore, prevents frictional contact between bearing surfaces when no pressurized fluid is supplied to the support cavity.

What is claimed is:

1. In a hydrostatic axial thrust bearing including: a support member; a load member disposed adjacent said support member, said load and support members having a support cavity formed therebetween; and means for admitting pressurized fluid to said support cavity for supporting said load member on said support member; the improvement comprising means for varying the effective bearing area of said support cavity in response to the load carried by said load member, thereby to permit the bearing to adjust to large load differences.

2. A bearing as recited in claim 1, wherein said cavity is circular and said means for varying the effective area of said cavity includes a spring ring supported at one of its radial end portions in said cavity, and the other end portion being free to be deflected under the pressure of the fluid in said cavity, said spring ring having associated therewith means disposed closely adjacent the load member and forming a circumferential limit for said support cavity said circumferential limit having a diameter which is variable depending on the deflection of the other end portion of said spring ring.

3. A bearing as recited in claim 2, wherein a number of concentric annular members are supported on said spring ring and are of such axial lengths that deflection of said spring member causes successively one ring after the other to be closest to the load member thereby successively increasing the effective area of said support cavity.

4. A bearing as recited in claim 2, wherein said spring ring has a surface of convex shape so disposed adjacent the load member, that said surface is closest to the load member at the other radial end portion (limit of the support cavity) of the spring ring when pressure of the hydrostatic fluid in the cavity is low and that deflection of the other end of the spring ring under increasing fluid in the cavity causes the limit of the support cavity to move radially toward the one end of said spring ring thereby to increase the effective area of the support cavity.

5. A bearing as recited in claim 2, wherein the area below the spring ring is sealed from the support cavity and is in communication with the area into which the pressurized fluid from said support cavity discharges.

6. A hydrostatic axial thrust bearing including a support member; a load member disposed adjacent said support member, said load and support members having a support cavity formed therebetween; means for admitting pressurized fluid to said support cavity for supporting said load member on said support member; and a spring ring firmly supported in said cavity at its radially outer end, the radially inner end of said spring ring being resiliently deflectable in a direction away from said load member, said spring ring having a convex surface area adjacent said load member with a leakage path being formed between the spring ring and the load member for the escape of pressurized fluid from the support cavity and the effective area of the support cavity being delineated by the perimeter of smallest distance between the convex surface area of the spring ring and the surface of the adjacent load member, the convex surface of said spring ring being so formed that deflection of said spring ring under the pressure of the fluid in the leakage path between the spring ring and the load member causes the perimeter of smallest distance between the spring ring and the load member to expand thereby increasing the effective area of the support cavity.

7. A bearing as recited in claim 6, wherein said support cavity is formed in said support member around a shaft extending through said support and load members and a limited leakage seal ring is disposed in said cavity with its seal face adjacent the load member to form the radially inner limit of said support cavity, said seal ring being freely axially movable to allow it to follow any axial movement of said load member relative to said support member.

8. A bearing as recited in claim 7, wherein spring means are provided for biasing said limited leakage seal ring toward said load member.

9. A bearing as recited in claim 6, wherein said spring ring is disposed in a ring cavity and seals are provided between the spring ring and the cavity walls at least at the inner end of the spring ring such that a back-up space is formed behind the spring ring, said back-up space being in communication with an area of a pressure lower than the pressure in said support cavity.

10. A bearing as recited in claim 6, wherein the area below the spring ring is sealed from the support cavity and is in communication with the area into which the pressurized fluid from said support cavity discharges.

* * * * *